United States Patent
Beber et al.

(12)

(10) Patent No.: US 8,671,832 B2
(45) Date of Patent: Mar. 18, 2014

(54) FOOD PROCESSOR WITH AN EXTERNAL CONTROL FOR ADJUSTING CUTTING THICKNESS

(75) Inventors: Kevin J. Beber, Granger, IN (US); Michael P. Conti, Saint Joseph, MI (US); Steven C. Drees, Stevensville, MI (US); David J. Gushwa, Mishawaka, IN (US); Arren J. McCormick, Benton Harbor, MI (US); David W. Robenalt, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 501 days.

(21) Appl. No.: 12/634,766

(22) Filed: Dec. 10, 2009

(65) Prior Publication Data

US 2011/0139017 A1   Jun. 16, 2011

(51) Int. Cl.
*A01J 15/02*   (2006.01)

(52) U.S. Cl.
USPC .................. 99/462; 241/83; 241/91; 241/92; 241/277

(58) Field of Classification Search
USPC ............... 99/537, 543, 545; 241/37, 92, 286; 83/356.3, 355, 592, 666, 676, 167, 83/932; 30/283
See application file for complete search history.

(56) References Cited

U.S. PATENT DOCUMENTS

| | | | |
|---|---|---|---|
| 2,189,199 A | 2/1940 | Criner | |
| 2,480,717 A | 8/1949 | Dodegge | |
| 3,199,860 A | 8/1965 | Moberg | |
| 3,623,525 A | 11/1971 | Kieves | |
| 3,704,736 A | 12/1972 | Pratley | |
| 4,190,208 A | 2/1980 | Schaeffer et al. | |
| 4,283,979 A | 8/1981 | Rakocy et al. | |
| 4,364,525 A * | 12/1982 | McClean | 241/92 |
| 4,369,680 A | 1/1983 | Williams | |
| 4,560,111 A * | 12/1985 | Cavalli | 241/92 |
| 4,570,519 A | 2/1986 | Motosko, II | |
| 4,624,166 A | 11/1986 | Kreth et al. | |
| 4,688,478 A * | 8/1987 | Williams | 99/503 |
| 4,733,589 A | 3/1988 | Wolff | |
| 4,877,191 A | 10/1989 | Golob et al. | |

(Continued)

FOREIGN PATENT DOCUMENTS

| | | |
|---|---|---|
| CN | 201101452 Y | 8/2008 |
| CN | 101496699 A | 8/2009 |

(Continued)

OTHER PUBLICATIONS

Wolfgang Puck Professional Series 12-Cup Food Processor Use and Care, Jul. 13, 2007, GP. 1-23, W. P. Appliances, Inc. Model WPMFP20C, Rev 1.0, Downloaded From TSCDIST_FoodProcManual on Apr. 12, 2010.

(Continued)

*Primary Examiner* — Gene Kim
*Assistant Examiner* — John E Simms, Jr.

(57) ABSTRACT

A food processor includes a bowl with a removable lid. Food items are advanced into the bowl through a feed tube formed in the lid where they are cut by a cutting assembly. The cutting assembly is adjustable to vary the thickness of the cut food items. A user-operated control device adjusts the cutting thickness of the cutting assembly. The control device is located outside of the bowl.

16 Claims, 8 Drawing Sheets

(56) References Cited

U.S. PATENT DOCUMENTS

| | | | | |
|---|---|---|---|---|
| 4,878,625 | A | * | 11/1989 | Newnan ............ 241/37 |
| 4,998,677 | A | | 3/1991 | Gallaher |
| 5,046,252 | A | | 9/1991 | Ayuta et al. |
| 5,197,681 | A | | 3/1993 | Liebermann |
| 5,395,060 | A | * | 3/1995 | Hackel et al. ............ 241/92 |
| 5,577,430 | A | | 11/1996 | Gunderson et al. |
| 7,004,056 | B2 | * | 2/2006 | Shorter et al. ............ 83/603 |
| 7,322,112 | B2 | | 1/2008 | Boerner |
| 7,681,817 | B2 | | 3/2010 | Orent |
| 7,694,615 | B2 | | 4/2010 | DiPietro |
| 2006/0075872 | A1 | | 4/2006 | Wangler |
| 2006/0150791 | A1 | | 7/2006 | Chase et al. |
| 2007/0044621 | A1 | | 3/2007 | Rote et al. |
| 2007/0209528 | A1 | | 9/2007 | Chang |
| 2007/0261523 | A1 | | 11/2007 | Hussey et al. |
| 2008/0115677 | A1 | | 5/2008 | Tseng et al. |
| 2008/0156913 | A1 | | 7/2008 | Orent |
| 2008/0163768 | A1 | | 7/2008 | Glucksman et al. |
| 2009/0301319 | A1 | | 12/2009 | Bigge et al. |
| 2009/0314168 | A1 | | 12/2009 | Krasznai |
| 2011/0139017 | A1 | | 6/2011 | Beber et al. |

FOREIGN PATENT DOCUMENTS

| | | |
|---|---|---|
| DE | 3644267 A1 | 7/1988 |
| EP | 010075 A2 | 2/1984 |
| EP | 0100755 A2 | 2/1984 |
| EP | 0244016 A1 | 11/1987 |
| FR | 2582497 | 12/1986 |
| FR | 2602660 | 2/1988 |
| FR | 2862199 A1 | 5/2005 |
| JP | 1153123 A | 6/1989 |
| JP | 1299522 A | 12/1989 |
| JP | 4099551 A | 3/1992 |
| JP | 4099552 A | 3/1992 |
| WO | 0221986 | 3/2002 |
| WO | 03057355 A1 | 7/2003 |
| WO | 2009/076585 A1 | 6/2009 |

OTHER PUBLICATIONS

Ellie; Home Cooking in Montana; Product Review . . . Cuisinart Elite 12 Cup Food Processor Model FP-12DC; Mar. 30, 2010; 17 Pages.

* cited by examiner

FOOD PROCESSOR WITH AN EXTERNAL CONTROL FOR ADJUSTING CUTTING THICKNESS

TECHNICAL FIELD

The present disclosure relates generally to a domestic food processor, and more particularly to a food processor having an external control for adjusting the cutting thickness of the food processor.

BACKGROUND

A food processor is a motorized domestic appliance for manipulating (e.g., chopping, slicing, dicing, shredding, grating, or blending) food items. Such an appliance includes a bowl with a removable lid. Food items are inserted into the bowl through a feed tube formed in the lid where they are cut by motor-driven cutting tool.

Food processors typically come equipped with a number of interchangeable cutting tools for slicing, shredding, or other food processing operations. One common cutting tool is a rotating disk-type cutter. Such a cutting tool includes a rotating disk having a cutting blade fixed thereto. The cutting blade is secured to the rotating disk at a location adjacent to an aperture formed in the disk so that pieces of food cut by the blade fall through the aperture and collect in the bottom of the bowl.

SUMMARY

According to one aspect of this disclosure, a food processor includes a base having a motor positioned therein. A removable bowl is coupled to the base. A removable lid is coupled to the bowl so as to define a processing chamber. The lid has a feed tube that opens into the bowl. A cutting assembly is positioned in the processing chamber. The cutting assembly is driven by the motor to cut food items advanced through the feed tube. The cutting assembly is positionable between a plurality of cutting positions to produce cut food items of varying thicknesses. An adjustment assembly is operable to move the cutting assembly between the plurality of cutting positions. The adjustment assembly includes a user-operated control device positioned outside of the processing chamber.

The user-operated control device may include a control knob that has a grip located outside of the processing chamber and a shaft extending through the lid into the processing chamber.

The cutting assembly may include a cutting blade and a rotating disk, with the adjustment assembly being operable to change the distance between the blade and the rotating disk. The cutting blade may move relative to the rotating disk, or the rotating disk may move relative to the cutting blade.

The adjustment assembly may include a screw-type drive assembly coupled to the shaft of the control knob.

According to another aspect, a food processor includes a base having a motor positioned therein. A removable bowl is coupled to the base. A removable lid is coupled to the bowl. The lid has a feed tube that opens into the bowl. A cutting assembly is positioned in the processing chamber. The cutting assembly is driven by the motor to cut food items advanced through the feed tube. The cutting assembly includes a rotating disk and a cutting blade, with the cutting blade being upwardly and downwardly movable relative to the rotating disk so as to adjust the distance therebetween. An adjustment assembly is operable to move the cutting blade relative to the rotating disk. The adjustment assembly includes a user-operated control device positioned outside of the bowl.

The user-operated control device may include a control knob that has a grip located outside of the processing chamber and a shaft extending through the lid into the processing chamber.

The adjustment assembly may include a screw-type drive assembly coupled to the cutting blade. Rotation of the screw-type drive assembly in a first direction causes upward movement of the cutting blade, whereas rotation of the screw-type drive assembly in a second direction causes downward movement of the cutting blade. The user-operated control device is operable to rotate the screw-type drive assembly.

The screw-type drive assembly includes an internally-threaded outer screw and an externally-threaded center screw positioned in the outer screw. In such an arrangement, the cutting blade may be secured to the outer screw such that rotation of the center screw in the first direction causes upward movement of the outer screw and the cutting blade, with rotation of the center screw in the second direction causing downward movement of the outer screw and the cutting blade.

According to yet another aspect, a food processor includes a base having a motor positioned therein. A removable bowl is coupled to the base. A removable lid is coupled to the bowl. The lid has a feed tube that opens into the bowl. A cutting assembly is positioned in the processing chamber. The cutting assembly is driven by the motor to cut food items advanced through the feed tube. The cutting assembly includes a rotating disk and a cutting blade, with the rotating disk being upwardly and downwardly movable relative to the cutting blade so as to adjust the distance therebetween. An adjustment assembly is operable to move the rotating disk relative to the cutting blade. The adjustment assembly includes a user-operated control device positioned outside of the bowl.

The user-operated control device may include a control knob that has a grip located outside of the processing chamber and a shaft extending through the lid into the processing chamber.

The adjustment assembly may include a screw-type drive assembly coupled to the rotating disk. Rotation of the screw-type drive assembly in a first direction causes upward movement of the rotating disk, whereas rotation of the screw-type drive assembly in a second direction causes downward movement of the rotating disk. The user-operated control device is operable to rotate the screw-type drive assembly.

The screw-type drive assembly includes an internally-threaded outer screw and an externally-threaded center screw positioned in the outer screw. In such an arrangement, the rotating disk may be secured to the outer screw such that rotation of the center screw in the first direction causes upward movement of the outer screw and the rotating disk, with rotation of the center screw in the second direction causing downward movement of the outer screw and the rotating disk.

BRIEF DESCRIPTION OF THE DRAWINGS

The detailed description particularly refers to the following figures, in which.

DETAILED DESCRIPTION OF THE DRAWINGS

Figure 1:
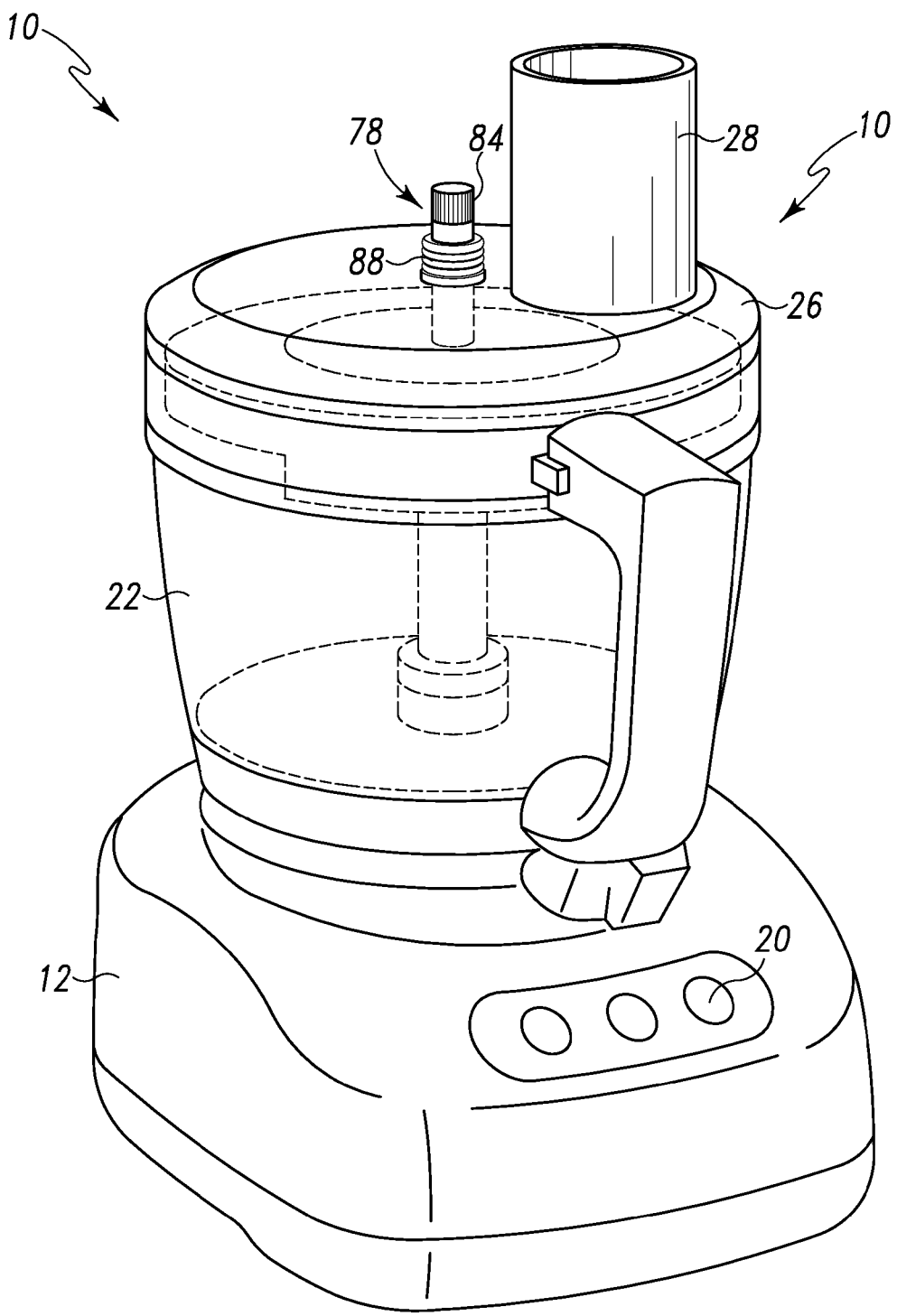
FIG. 1 is a perspective view of a food processor.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIGS. 1-5, a food processor 10 is shown. The food processor 10 has a base 12 which houses a motor 14 (shown schematically in FIG. 3) and a control unit (not shown). Under the control of the control unit, the motor's output shaft 16 drives a cutting blade 18 to cut food items such as fruits and vegetables. The base 12 also includes one or more buttons, switches, dials, or other types of controls 20. A user operates the controls 20 to control operation of the motor 14 and hence the food processor 10. For instance, one of the controls 20 may be operable to turn the motor 14 on and off, while another control 20 may change the motor's speed.

As will be understood by those skilled in the art, the control unit may comprise analog and/or digital circuitry to process electrical signals received from the motor 14 (or other components of the food processor 10) and provide electrical control signals to the motor or other components of the food processor 10. For example, the control unit may be embodied as a microcontroller that executes firmware routines to control the operation of the food processor 10.

A removable bowl 22 is secured to the base 12. The bowl's handle facilitates placement of the bowl 22 on the base 12. The bowl 22 includes a removable lid 26 secured to its upper peripheral edge. The lid 26 has a feed tube 28 formed therein through which food items such as fruits and vegetables are inserted into the bowl 22 to be processed by the food processor 10. Collectively, the lid 26 and the bowl 22 define a processing chamber 24 where food items are processed by the cutting blade 18.

The bowl 22, lid 26, and feed tube 28 are generally made of a transparent or translucent material, so that the contents of the food processor 10 can be viewed by a user without removing the lid 26 from the bowl 22. Moreover, one or more locking mechanisms may be used to lock the bowl to the base 12 and the lid 26 to the bowl 22.

Figure 2:
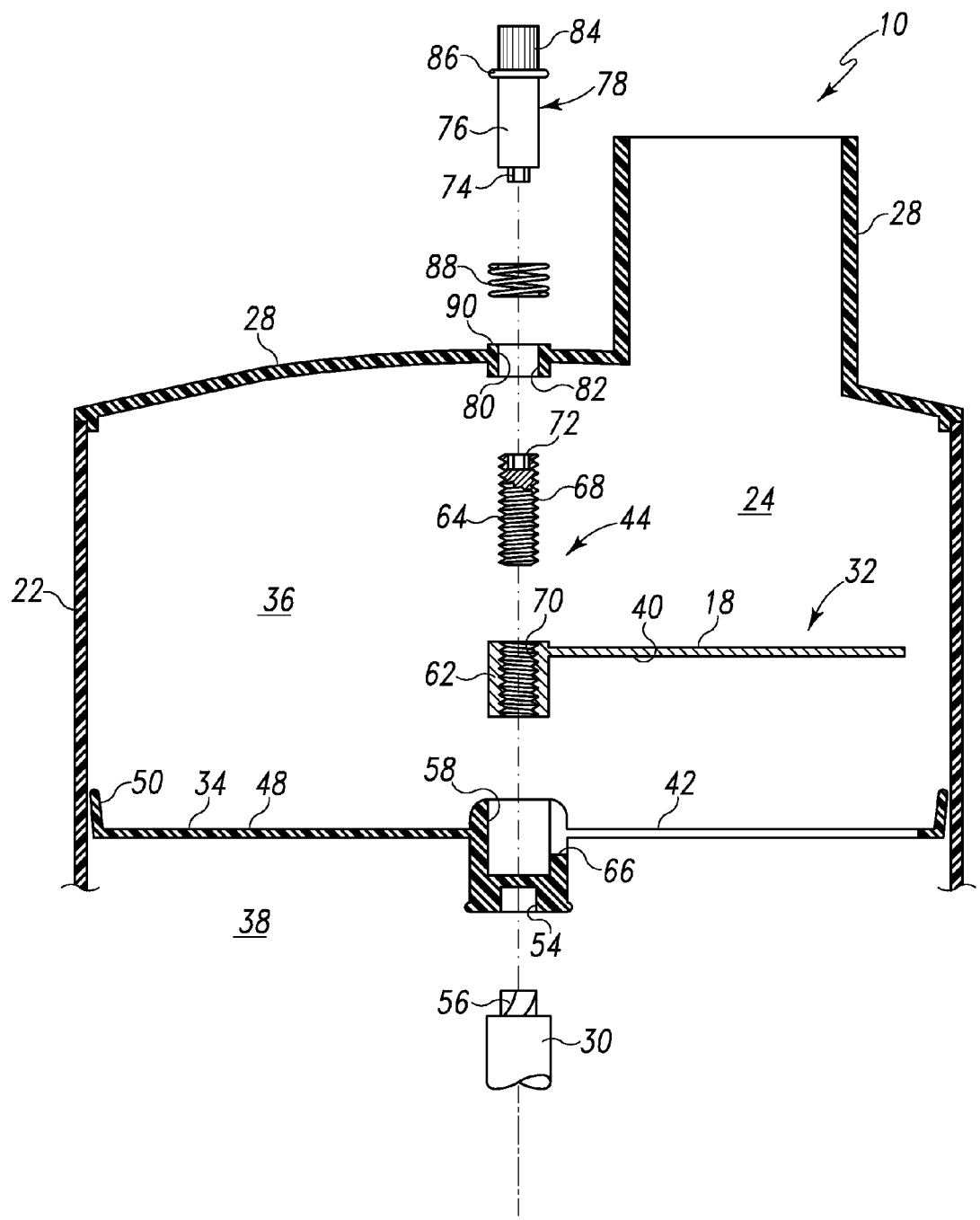
FIG. 2 is an exploded partial cross sectional view of the food processor of FIG. 1.
Figure 3:
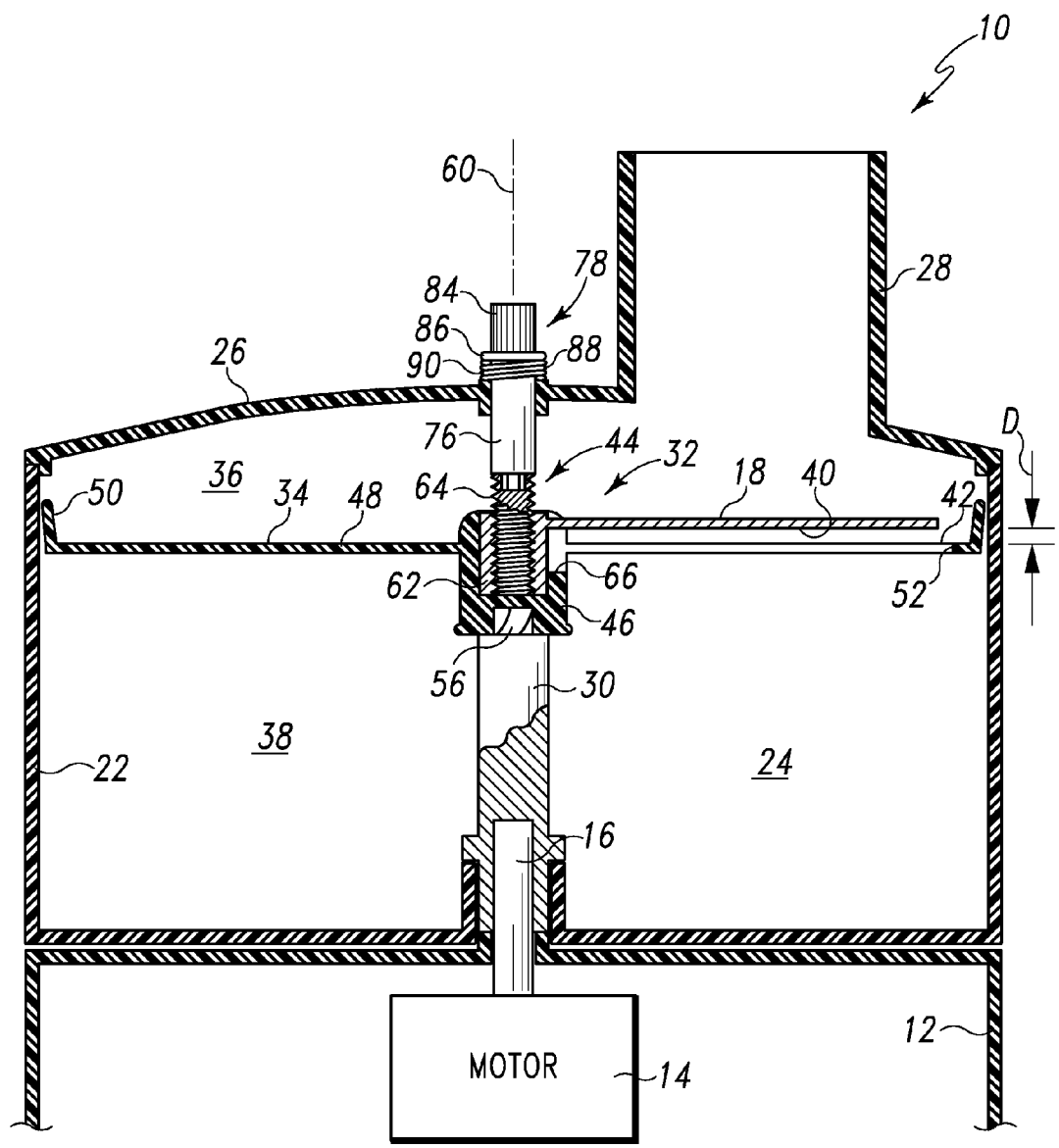
FIG. 3 is a partial cross sectional view of the food processor of FIG. 1 showing the control knob positioned in its engaged position.
Figure 4:
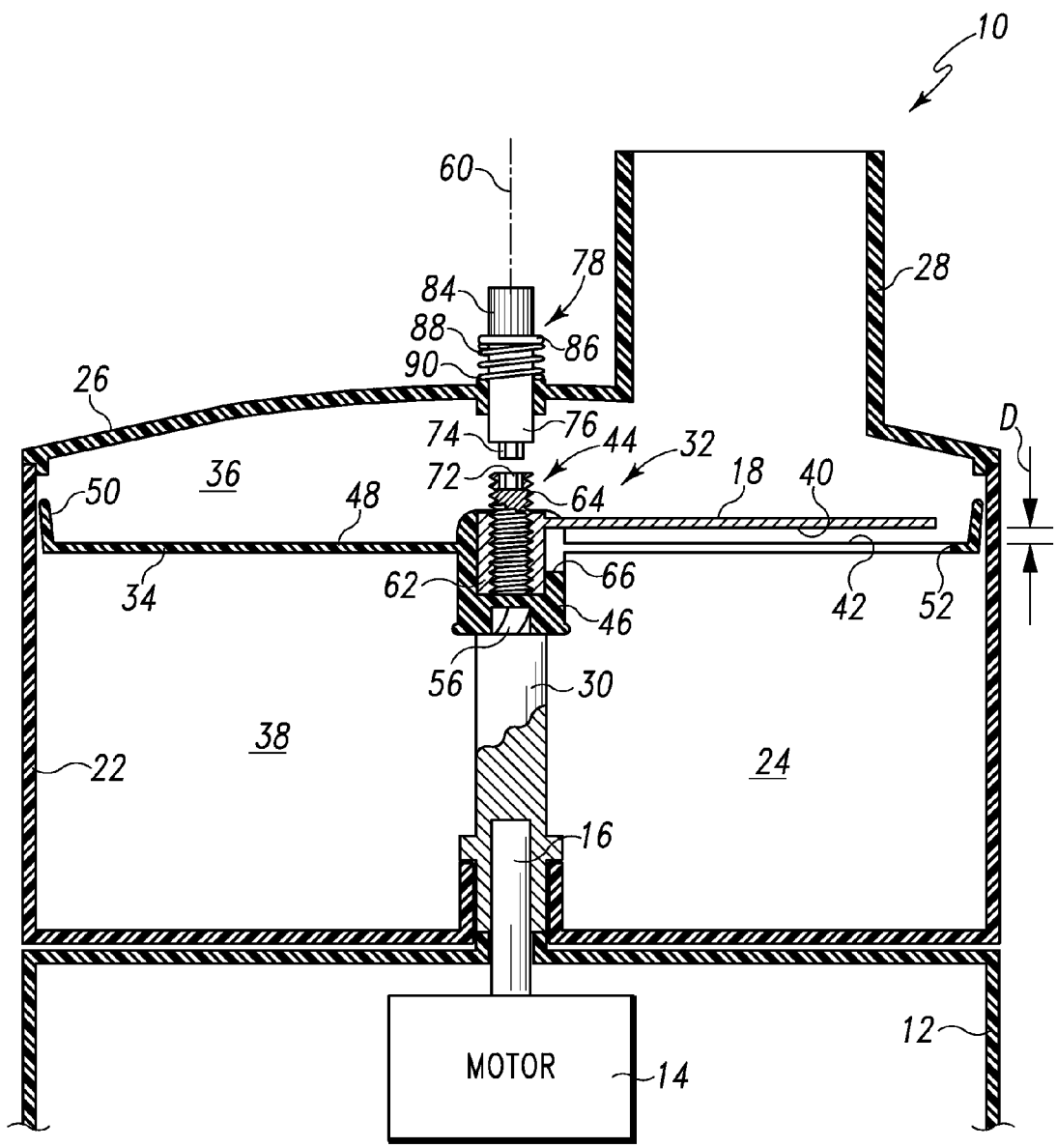
FIG. 4 is a view similar to FIG. 3, but showing the control knob positioned in its disengaged position.

As shown in FIGS. 2-4, when the removable bowl 22 is secured to the base 12, the output shaft 16 of the motor 14 is coupled to a drive stem 30. The drive stem 30 is in turn coupled to a cutting assembly 32. In addition to the cutting blade 18, the cutting assembly 32 includes a rotating disk 34 that effectively divides the cutting chamber 24 into an upper compartment 36 located between the disk 34 and the lid 26, and a lower compartment 38 located underneath the disk 34. A vertical distance, D, between the cutting edge 40 of the cutting blade 18 and the upper surface 42 of the rotating disk 34 defines a cutting thickness. In other words, the thickness of the pieces of food items cut by the food processor 10 is determined by the distance D between the cutting edge 40 of the cutting blade 18 and the upper surface 42 of the rotating disk 34. As the distance D between the cutting edge 40 of the cutting blade 18 and the upper surface 42 of the rotating disk 34 increases, thicker pieces of food items are created, with thinner pieces of food items being created when the distance D between the cutting edge 40 of the cutting blade 18 and the upper surface 42 of the rotating disk 34 decreases.

A thickness adjustment assembly 44 is operable by a user to vary the cutting thickness of the food processor 10 thereby creating thicker or thinner pieces of cut food items. The adjustment assembly 44 includes user-activated control device that is located outside of the processing chamber 24 defined by the bowl 22 and the lid 26. What is meant herein by the term "outside" as it relates to the location of the user-activated control device relative to the bowl or the processing chamber is that the structure of the control device contacted by the user to operate the device is positioned external to the bowl and lid so that it may be operated by the user while the lid is secured to the bowl thereby allowing the cutting thickness of the food processor to be adjusted without removing the lid from the bowl. For example, in the illustrative embodiment described herein, the external control device is embodied as a control knob that includes a grip extending out of the lid that may be rotated by a user to change the cutting thickness of the food processor without removing the lid from the bowl. In such a configuration, the user rotates the control knob one direction or the other to change (i.e., increase or decrease) the distance D between the cutting edge 40 of the cutting blade 18 and the upper surface 42 of the rotating disk 34. It should be appreciated that other user-activated control devices, such as levers, dials, buttons, or the like, may be substituted for the control knob.

As shown in FIGS. 2-4, the rotating disk 34 includes a central hub 46 having a planar body 48 extending radially outward therefrom. A rim 50 extends upwardly from the outer perimeter of the disk's planar body 48. The rotating disk 34 has a diameter that is slightly less than the inner diameter of the bowl 22 such that the rim 50 is positioned adjacent to, but spaced slightly apart from, the inner wall of the bowl to permit rotation of the disk 34 within the bowl 22. In the exemplary embodiment described herein, the rotating disk 34 is embodied as a monolithic structure (e.g., a single molded or cast part). However, it should be appreciated that the components of the rotating disk 34 (e.g., the hub 46, body 48, and rim 50) may be embodied as separate components secured to one another by an adhesive or other suitable fastener.

Figure 5:
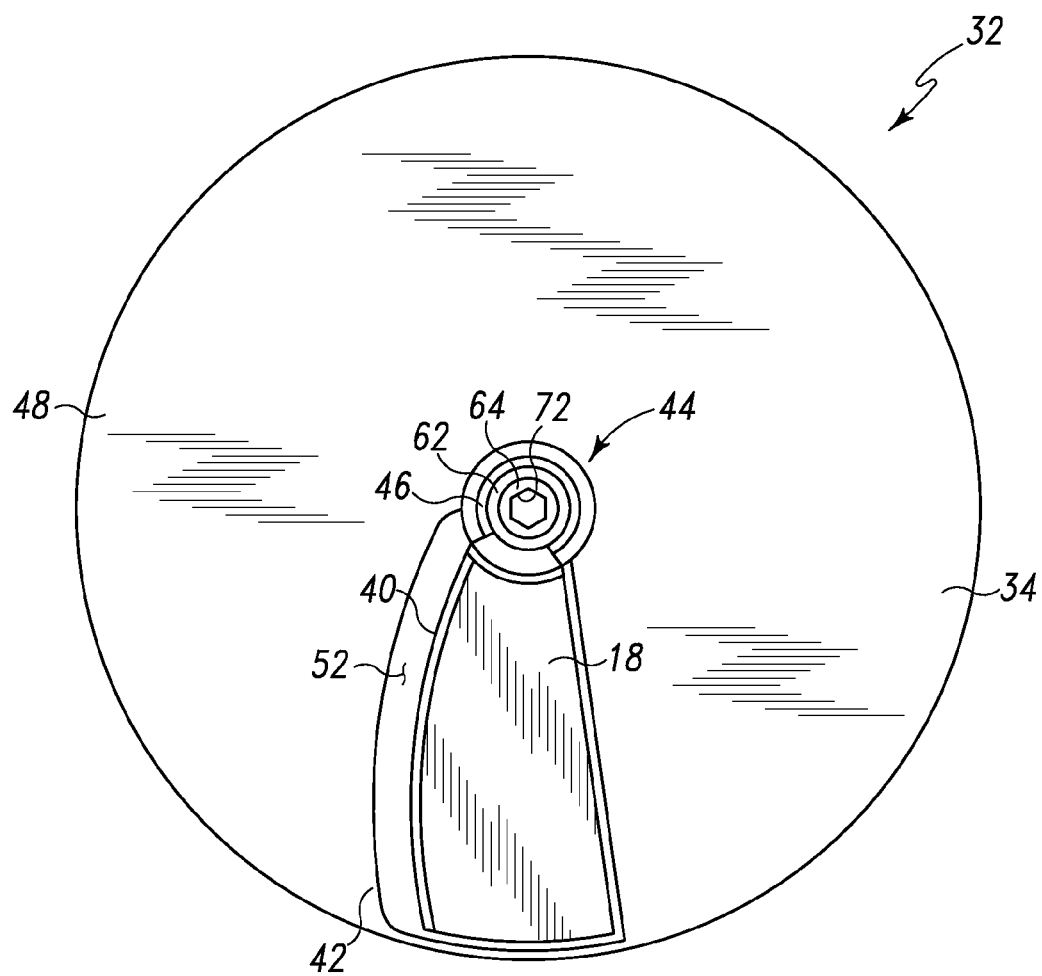
FIG. 5 is a top view of the cutting assembly and the thickness adjustment assembly of the food processor of FIG. 1.

Food items inserted through the feed tube 28 are urged into contact with the upper surface 42 of the rotating disk 34 while being acted upon (i.e., cut) by the cutting blade 18. As shown in FIGS. 3-5, a gap 52 formed in the body 48 of the rotating disk 34 allows cut food to fall into the lower compartment 38 of the bowl 22.

The hub 46 of the rotating disk 34 has a socket 54 formed in its lower end. A drive spline 56 formed in the upper end of the drive stem 30 is received into the socket 54 thereby coupling the drive stem 30 (and hence the output shaft 16 of the motor 14) to the hub 46 of the rotating disk 34. As such, rotation of the output shaft 16 causes rotation of the disk 34. It should be appreciated that the position of the socket and the spline may be reversed with the spline being formed in the hub 46 and the socket being formed in the drive stem 30. The hub 46 of the rotating disk 34 has an upwardly facing pocket 58 formed in its upper end. The pocket 58 is coaxial with the socket 54, with their respective center lines being coincident with the axis of rotation 60 of the motor's output shaft 16.

As shown in FIGS. 2 and 3, the thickness adjustment assembly 44 includes a screw-type drive assembly having an internally-threaded outer screw 62 and an externally-threaded center screw 64. The inner end of the cutting blade 18 is secured to the cylindrically-shaped outer screw 62. The cutting blade 18 may be soldered or otherwise secured to the outer screw 62, or may be integrally formed therewith. The outer screw 62 is positioned in the pocket 58 of the hub 46 of the rotating disk 34. In such a configuration, the cutting blade 18 extends outwardly through a slot 66 formed in the hub 46.

The outer screw 62 translates upwardly and downwardly within the hub 46 of the rotating disk 34 to change the thickness of the food items being processed by the food processor 10. In particular, when the outer screw 62 is moved upwardly within the hub 46, the distance D between the cutting edge 40 of the cutting blade 18 and the upper surface 42 of the rotating disk 34 increases thereby producing thicker pieces of food items. Oppositely, when the outer screw 62 is moved downwardly within the hub 46, the distance D between the cutting edge 40 of the cutting blade 18 and the upper surface 42 of the rotating disk 34 decreases thereby producing thinner pieces of food items.

The external threads 68 of the center screw 64 threadingly engage the internal threads 70 of the outer screw 62 to move the outer screw 62 (and hence the cutting blade 18) upwardly and downwardly within the hub 46 in such a manner. For example, clockwise rotation of the center screw 64 may cause upward movement of the outer screw 62 (and hence the cutting blade 18), while counter-clockwise rotation of the center screw 64 causes downward movement of the outer screw 62 (and hence the cutting blade 18). As can be seen from FIGS. 2-4, the center screw 64 is slightly longer than the outer screw 62. The length of the center screw 64 defines the distance of travel the outer screw 62 is permitted to translate within the hub 46, with such a distance being altered to fit the needs of a given design.

The center screw 64 has a keyed socket 72 formed in its upper end. In the exemplary embodiment described herein, the keyed socket 72 is a hexagonally-shaped recess. The keyed socket 72 is configured (i.e., sized) to receive a complimentary-shaped keyed spline 74 formed on the end of the elongated shaft 76 of a control knob 78. It should be appreciated that the locations of the keyed structures may be reversed with the spline formed on the end of the center screw 64 and the socket formed in the end of the control knob's shaft 76. It should be appreciated that other mechanical arrangements may be used to selectively couple the control knob to the center screw.

As can be seen best in FIG. 2, the shaft 76 of the control knob 78 extends through an opening 80 formed in the lid 26. The opening is defined by a bearing surface 82 formed in the lid 26. It should be appreciated that the bearing surface 82 could be embodied in a separate component that is secured to the lid 26. The top end of the control knob 78 has a knurled grip 84 formed therein. A user grips the knurled grip 84 to rotate the control knob 78. An annular shoulder 86 is formed on the control knob 78 just below the grip 84. A biasing spring 88 is captured on the control knob's shaft 76 and is positioned between the upper surface 90 of the lid 26 and the shoulder 86 of the control knob 78.

As shown in FIG. 5, the spring 88 biases (i.e., urges) the control knob 78 into a disengaged position in which its keyed spline 74 is decoupled from (i.e., spaced apart or removed from) the keyed socket 72 of the center screw 64. In such a position, the cutting assembly 32 rotates freely of the control knob 78. However, when a user desires to change the thickness of the food items being processed by the food processor 10, the user may grab the knurled grip 84 and push the control knob 78 downwardly. Doing so overcomes the bias of the spring 88 thereby urging the control knob 78 downwardly into an engaged position in which its keyed spline 74 is coupled to (i.e., positioned or received into) the keyed socket 72 of the center screw 64 (as shown in FIG. 3).

When the control knob 78 is positioned in its engaged position (as shown in FIG. 3), the user may rotate the knurled grip 84 to change the thickness of the food items being processed by the food processor 10. For example, the user may rotate the control knob 78 in the clockwise direction thereby causing the center screw 64 to likewise be rotated in the clockwise direction. Such clockwise rotation of the center screw 64 causes the outer screw 62 (and hence the cutting blade 18) to move upwardly within the hub 46, thereby increasing the distance D between the cutting edge 40 of the cutting blade 18 and the upper surface 42 of the rotating disk 34 which, in turn, produces thicker pieces of food items. Oppositely, the user may rotate the control knob 78 in the counterclockwise direction thereby causing the center screw 64 to likewise be rotated in the counterclockwise direction. Such counterclockwise rotation of the center screw 64 causes the outer screw 62 (and hence the cutting blade 18) to move downwardly within the hub 46, thereby decreasing the distance D between the cutting edge 40 of the cutting blade 18 and the upper surface 42 of the rotating disk 34 which, in turn, produces thinner pieces of food items.

Figure 6:
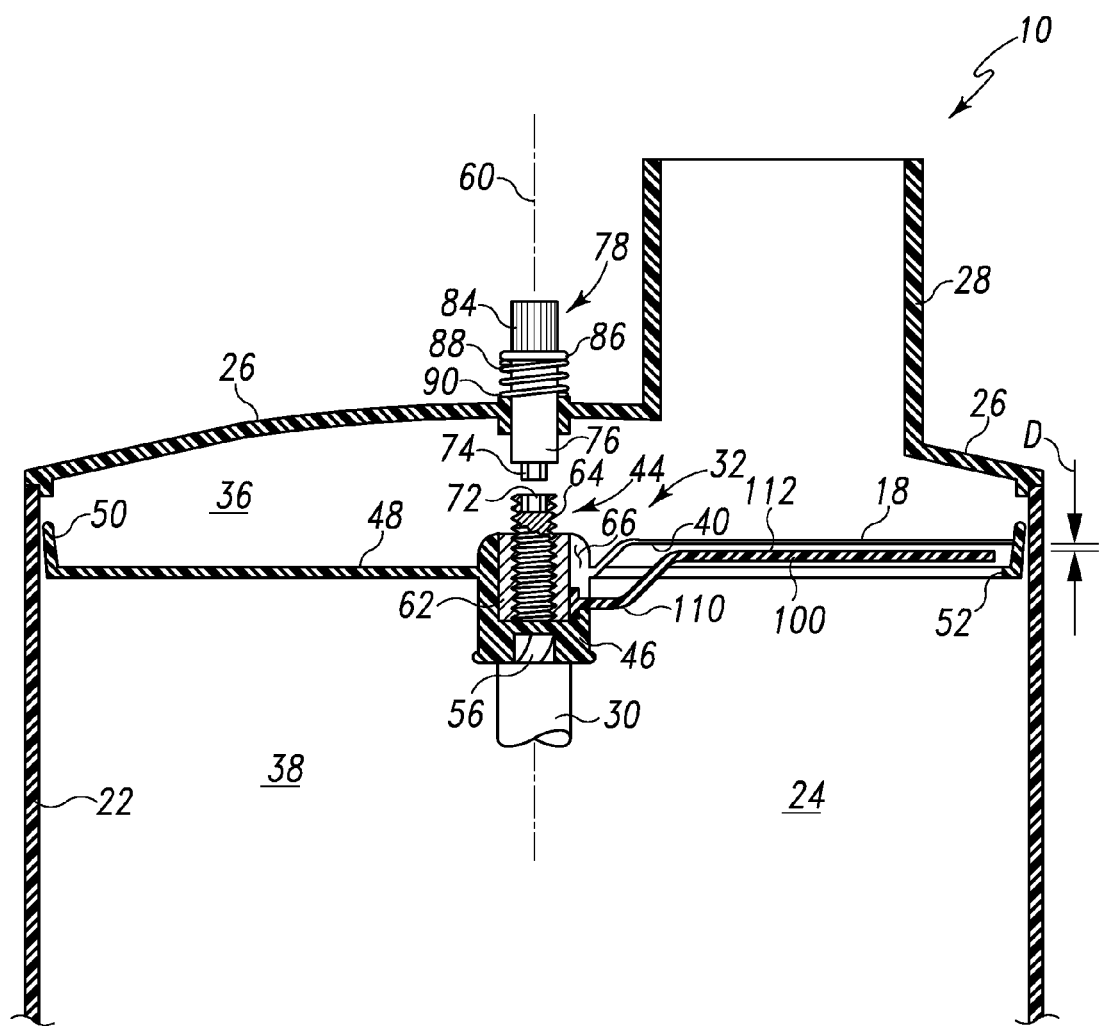
FIG. 6 is a partial cross sectional view of another embodiment of a food processor.
Figure 7:
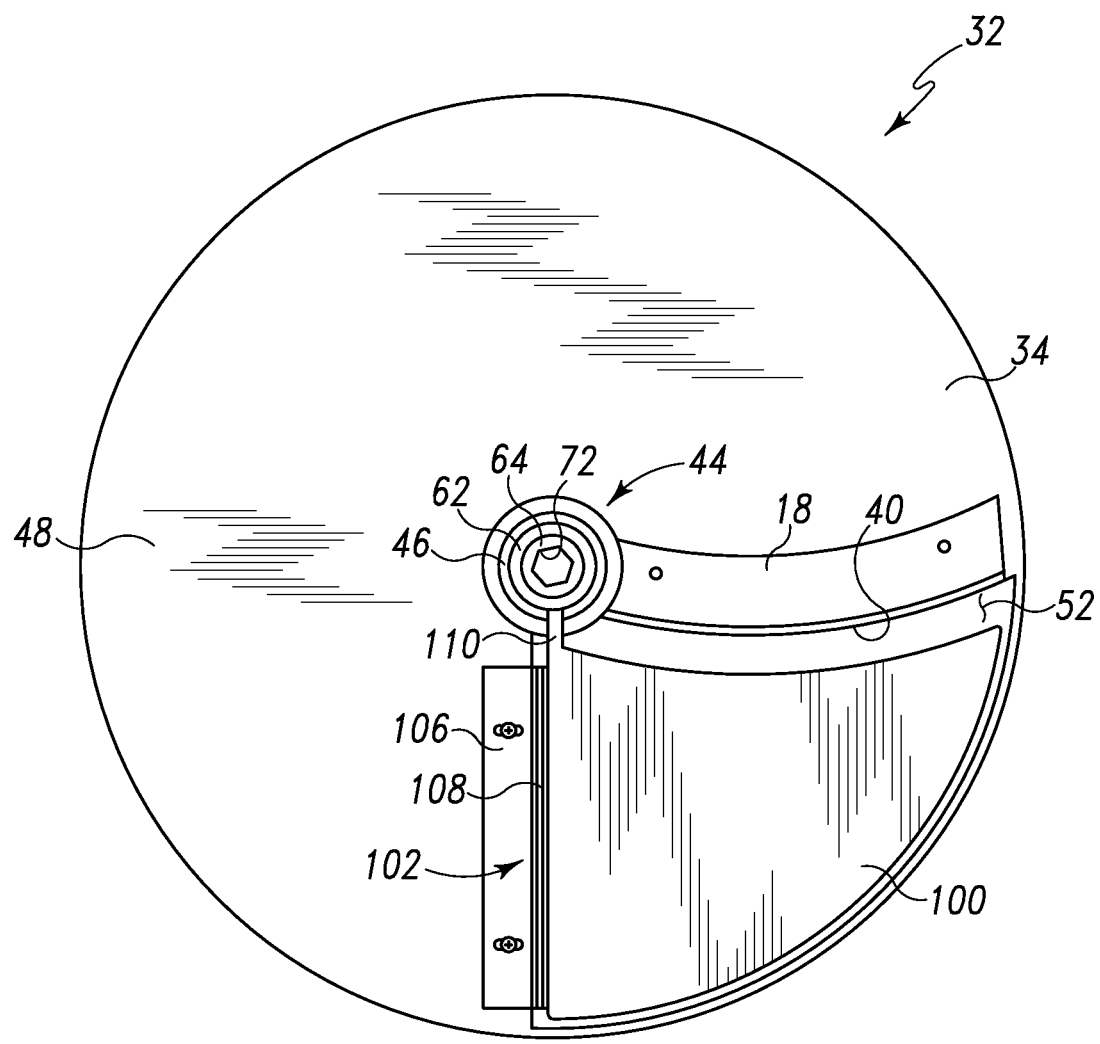
FIG. 7 is a view similar to FIG. 5, but showing the food processor of FIG. 6.
Figure 8:
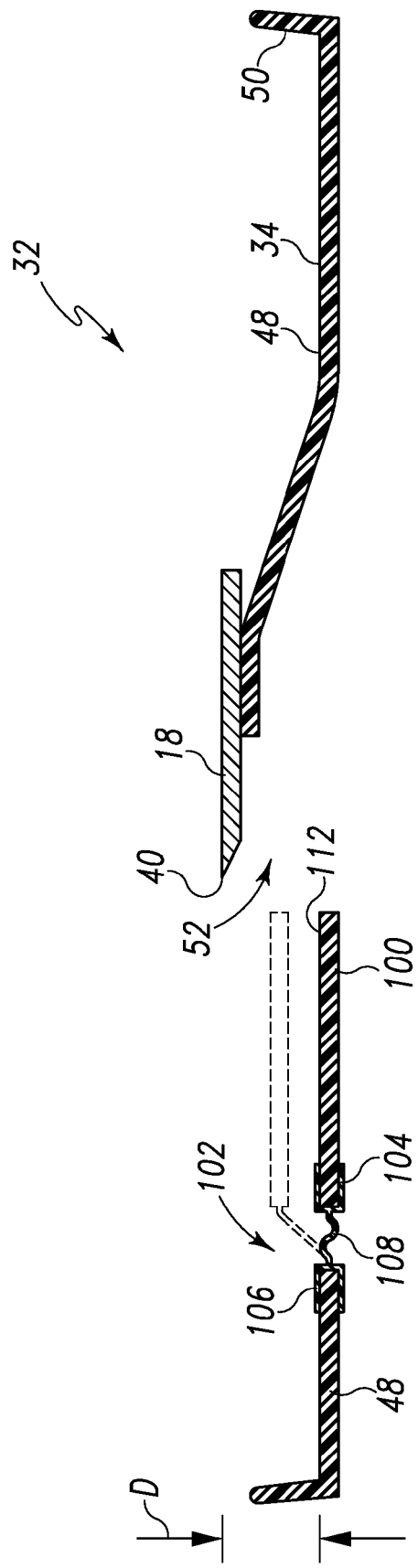
FIG. 8 is a cross sectional view of the cutting assembly of the food processor of FIG. 6.

Referring now to FIGS. 6-8, another embodiment of a food processor is shown. Many of the components of the food processor of FIGS. 6-8 are common with the components of the food processor of FIGS. 1-5. Such common components have common reference numerals. The food processor of FIGS. 6-8 is essentially the same as the food processor of FIGS. 1-5 except that instead of adjusting the thickness of the cut food items by moving the cutting blade 18 relative to rotating disk 34, the rotating disk 34 is moved relative to the cutting blade 18.

As shown in FIGS. 6 and 7, the inner end of the cutting blade 18 is secured to the hub 46 of the rotating disk 34. As such, it is fixed in position relative to rotating disk 34. In contrast to the embodiment of FIGS. 1-5, a portion of the planar body 48 of the rotating disk 34 has been removed and replaced with a movable plate 100. As shown in FIGS. 7 and 8, one edge of the movable plate 100 is secured to the planar body 48 of the rotating disk 34 by a hinge 102. In the exemplary embodiment described herein, the hinge 102 is embodied as an accordion-type hinge having a pair of hinge plates 104, 106 coupled to one another by a flexible connector 108. It should be appreciated, however, that other types of hinges may also be used such as a piano hinge or the like. The hinge plate 104 is secured to the movable plate 100, with the hinge plate 106 being secured to the planar body 48 of the rotating disk 34. As shown in FIG. 8, such an arrangement allows the movable plate 100 to move upwardly and downwardly relative to the planar body 48 of the rotating disk 34 and hence the cutting edge 40 of the cutting blade 18.

As shown in FIGS. 6 and 7, an inner end 110 of the movable plate 100 is secured to the outer screw 62. The inner end 110 of the movable plate 100 may be secured to the outer screw 62 via adhesive or by the use of other fasteners such as rings, tubes, clips, or the like. In such a configuration, the movable plate 100 extends outwardly through the slot 66 formed in the hub 46. As can be seen best in FIGS. 6 and 8, the thickness of the food items processed by the food processor of FIGS. 6-8 is determined by the distance, D, between an upper surface 112 of the movable plate 100 of the rotating disk 34 and the cutting edge 40 of the fixed cutting blade 18. Cut food items fall into the lower compartment 38 of the bowl 22 via the gap 52.

In a similar manner to as described above in regard to the embodiment of FIGS. 1-5, upward and downward translation of the outer screw 62 changes the thickness of the food items being processed by the food processor 10 of FIGS. 6-8, albeit in opposite directions. In particular, when the outer screw 62 is moved upwardly within the hub 46, the distance D between the cutting edge 40 of the cutting blade 18 and the upper surface 112 of the movable plate 100 of the rotating disk 34 decreases thereby producing thinner pieces of food items. Oppositely, when the outer screw 62 is moved downwardly, the distance D between the cutting edge 40 of the cutting blade 18 and the upper surface 112 of the movable plate 100 of the rotating disk 34 increases thereby producing thicker pieces of food items.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

For example, while food processor 10 is herein illustrated as a conventional domestic food processor, the features and aspects disclosed herein can also be implemented in other types of food processing devices such as automatic food slicers, dicers, ice shavers and the like.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A food processor, comprising:
a base having a motor positioned therein,
a removable bowl coupled to the base,
a removable lid coupled to the bowl so as to define a processing chamber, the lid having a feed tube that opens into the bowl,
a cutting assembly comprising a cutting blade and a rotating disk positioned in the processing chamber, the cutting blade and the rotating disk configured to be driven by the motor to rotate to cut food items advanced through the feed tube, one of the cutting blade and the rotating disk being positionable relative to the other of the cutting blade and the rotating disk between a plurality of cutting positions to produce cut food items of varying thicknesses, and
an adjustment assembly operable to move the one of the cutting blade and the rotating disk between the plurality of cutting positions to change the distance between the blade and the rotating disk, wherein the adjustment assembly comprises (i) a shaft configured to be selectively engaged and disengaged with a portion of the cutting assembly, and (ii) a user-operated control device positioned outside of the processing chamber,
wherein (i) the user-operated control device is isolated from the motor such that the user-operated control device is not driven by the motor when the cutting blade and the rotating disk are driven to cut food items, and (ii) the user-operated control device is operable to move the one of the cutting blade and the rotating disk between the plurality of cutting positions when the shaft is engaged with the cutting assembly.

2. The food processor of claim 1, wherein the user-operated control device comprises a control knob having a grip located outside of the processing chamber and a shaft extending through the lid into the processing chamber.

3. The food processor of claim 1, wherein the adjustment assembly is operable to move the cutting blade relative to the rotating disk.

4. The food processor of claim 1, wherein the adjustment assembly is operable to move the rotating disk relative to the cutting blade.

5. The food processor of claim 1, wherein:
the user-operated control device comprises a control knob having a grip located outside of the processing chamber, and a
the shaft extends through the lid into the processing chamber, and
the adjustment assembly comprises a screw-type drive assembly coupled to the shaft.

6. The food processor of claim 1, wherein:
the adjustment assembly comprises a screw-type drive assembly operable to adjust the distance between the cutting blade and the rotating disk.

7. A food processor, comprising:
a base having a motor positioned therein,
a removable bowl coupled to the base,
a removable lid coupled to the bowl, the lid having a feed tube that opens into the bowl,
a cutting assembly positioned in the bowl and driven by the motor to cut food items advanced through the feed tube, wherein (i) the cutting assembly comprises a rotating disk and a cutting blade that rotate when the cutting assembly is driven by the motor, and (ii) the cutting blade is upwardly and downwardly movable relative to the rotating disk so as to adjust the distance therebetween, and
an adjustment assembly operable to move the cutting blade relative to the rotating disk, wherein the adjustment assembly comprises a user-operated control device positioned outside of the bowl, wherein the user-operated control device is isolated from the motor such that the user-operated control device is not driven by the motor when the cutting assembly is driven to cut food items, the user-operated control device comprising: (i) a shaft configured to selectively engage and disengage with a portion of the cutting assembly that is configured to be rotated by the motor, and (ii) a control knob having a grip located outside of the bowl, the control knob being operable to move the cutting blade relative to the rotating disk when the shaft is engaged with the cutting assembly.

8. The food processor of claim 7, wherein:
the adjustment assembly comprises a screw-type drive assembly coupled to the cutting blade, and
rotation of the screw-type drive assembly in a first direction causes upward movement of the cutting blade, and
rotation of the screw-type drive assembly in a second direction causes downward movement of the cutting blade.

9. The food processor of claim 8, wherein the user-operated control device is operable to rotate the screw-type drive assembly.

10. The food processor of claim 8, wherein:
the screw-type drive assembly comprises an internally-threaded outer screw and an externally-threaded center screw positioned in the outer screw,
the cutting blade is secured to the outer screw, and
rotation of the center screw in the first direction causes upward movement of the outer screw and the cutting blade, and
rotation of the center screw in the second direction causes downward movement of the outer screw and the cutting blade.

11. A food processor, comprising:
a base having a motor positioned therein,
a removable bowl coupled to the base,
a removable lid coupled to the bowl, the lid having a feed tube that opens into the bowl,
a cutting assembly positioned in the bowl and driven by the motor to cut food items advanced through the feed tube, wherein (i) the cutting assembly comprises a rotating disk and a cutting blade that rotate when the cutting assembly is driven by the motor, and (ii) the rotating disk is upwardly and downwardly movable relative to the cutting blade so as to adjust the distance therebetween, and
an adjustment assembly operable to move the rotating disk relative to the cutting blade, wherein the adjustment assembly comprises a user-operated control device positioned outside of the bowl, wherein the user-operated control device is isolated from the motor such that the user-operated control device is not driven by the motor when the cutting assembly is driven by the motor, the user-operated control device comprising: (i) a shaft configured to selectively engage and disengage with a portion of the cutting assembly that is configured to be rotated by the motor, and (ii) a control knob having a grip located outside of the bowl, the control knob being operable to move the rotating disk relative to the cutting blade when the shaft is engaged with the cutting assembly.

12. The food processor of claim 11, wherein:
the adjustment assembly comprises a screw-type drive assembly coupled to the rotating disk, and
rotation of the screw-type drive assembly in a first direction causes upward movement of the rotating disk, and
rotation of the screw-type drive assembly in a second direction causes downward movement of the rotating disk.

13. The food processor of claim 12, wherein the user-operated control device is operable to rotate the screw-type drive assembly.

14. The food processor of claim 12, wherein:
the screw-type drive assembly comprises an internally-threaded outer screw and an externally-threaded center screw positioned in the outer screw,
the rotating disk is secured to the outer screw, and
rotation of the center screw in the first direction causes upward movement of the outer screw and the rotating disk, and
rotation of the center screw in the second direction causes downward movement of the outer screw and the rotating disk.

15. The food processor of claim 8, wherein (i) the shaft is engaged with the screw-type drive assembly when the shaft is engaged with the cutting assembly, and (ii) the shaft is spaced apart from the screw-type drive assembly when the shaft is disengaged from the cutting assembly.

16. The food processor of claim 12, wherein the shaft is engaged with the screw-type drive assembly when the shaft is engaged with the cutting assembly, and (ii) the shaft is spaced apart from the screw-type drive assembly when the shaft is disengaged from the cutting assembly.

* * * * *